United States Patent
Shivanath et al.

(10) Patent No.: US 11,465,209 B2
(45) Date of Patent: Oct. 11, 2022

(54) BINDER JETTING AND SUPERSOLIDUS SINTERING OF FERROUS POWDER METAL COMPONENTS

(71) Applicant: Stackpole International Powder Metal LLC, Ancaster (CA)

(72) Inventors: Rohith Shivanath, Toronto (CA); Peng Shen, Oakville (CA); Vincent Williams, Oakville (CA)

(73) Assignee: Stackpole International Powder Metal LLC, Ancaster Ontario (CA)

( * ) Notice: Subject to any disclaimer, the term of this patent is extended or adjusted under 35 U.S.C. 154(b) by 180 days.

(21) Appl. No.: 16/407,473

(22) Filed: May 9, 2019

(65) Prior Publication Data

US 2019/0344344 A1 Nov. 14, 2019

Related U.S. Application Data

(60) Provisional application No. 62/669,450, filed on May 10, 2018.

(51) Int. Cl.
*B22F 10/10* (2021.01)
*B22F 3/11* (2006.01)
(Continued)

(52) U.S. Cl.
CPC .......... *B22F 10/10* (2021.01); *B22F 3/1035* (2013.01); *B22F 3/1103* (2013.01);
(Continued)

(58) Field of Classification Search
CPC ...... B22F 3/1146; B22F 3/1103; B22F 9/082; B22F 2301/35; B22F 2302/10;
(Continued)

(56) References Cited

U.S. PATENT DOCUMENTS

| 4,071,354 A | 1/1978 | Mocarski |
| 4,501,613 A | 2/1985 | Matsumoto |

(Continued)

FOREIGN PATENT DOCUMENTS

| CN | 104399986 A | 3/2015 |
| CN | 104711442 A | 6/2015 |

(Continued)

OTHER PUBLICATIONS

International Preliminary Report on Patentability dated Aug. 7, 2020 issued in corresponding International Application No. PCT/IB2019/053831 (18 pgs.).

(Continued)

*Primary Examiner* — Nicholas A Wang
*Assistant Examiner* — Jacob J Gusewelle
(74) *Attorney, Agent, or Firm* — Pillsbury Winthrop Shaw Pittman, LLP

(57) ABSTRACT

A densified, high-strength metallic component is manufactured by: binder jet additive manufacture (BJAM) printing a powder blend to form a printed part; and super solidus sintering the printed part to form the metallic component, which may then be heat treated. The powder blend comprises a blend of water atomized base iron powder and a high-carbon master ferroalloy powder. The high-carbon ferroalloy powder introduces high concentrations of carbon into a powder blend that is readily BJAM printable.

35 Claims, 2 Drawing Sheets

(51) Int. Cl.
  *B22F 9/08* (2006.01)
  *B22F 3/10* (2006.01)
  *B33Y 80/00* (2015.01)
  *B33Y 10/00* (2015.01)
  *B33Y 70/00* (2020.01)

(52) U.S. Cl.
  CPC ............ *B22F 3/1146* (2013.01); *B22F 9/082* (2013.01); *B22F 2009/0828* (2013.01); *B22F 2301/35* (2013.01); *B22F 2302/10* (2013.01); *B22F 2304/10* (2013.01); *B22F 2998/10* (2013.01); *B33Y 10/00* (2014.12); *B33Y 70/00* (2014.12); *B33Y 80/00* (2014.12)

(58) Field of Classification Search
  CPC .......... B22F 2009/0828; B22F 2998/10; B22F 2304/10; B22F 3/1035; B33Y 80/00; B33Y 10/00; B33Y 70/00
  See application file for complete search history.

(56) References Cited

U.S. PATENT DOCUMENTS

| | | | |
|---|---|---|---|
| 4,743,425 A | | 5/1988 | Ohsaki et al. |
| 5,108,493 A | * | 4/1992 | Causton .............. C22C 33/0264 75/255 |
| 5,516,483 A | | 5/1996 | Shivanath et al. |
| 7,070,734 B2 | | 7/2006 | Liu et al. |
| 7,094,473 B2 | * | 8/2006 | Takayama ................. B22F 7/04 428/545 |
| 9,546,412 B2 | | 1/2017 | Christopherson, Jr. et al. |
| 2006/0083652 A1 | | 4/2006 | Liu et al. |
| 2006/0099079 A1 | | 5/2006 | Kawase et al. |
| 2006/0285991 A1 | * | 12/2006 | McKinley ............. B22F 1/0077 419/36 |
| 2009/0252636 A1 | * | 10/2009 | Christopherson, Jr. ...................... C22C 33/0285 419/14 |
| 2013/0039796 A1 | | 2/2013 | L'Esperance et al. |
| 2015/0125334 A1 | | 5/2015 | Uetani et al. |
| 2016/0375493 A1 | | 12/2016 | Stoyanov et al. |
| 2017/0080497 A1 | * | 3/2017 | Tuffile ....................... B22F 3/26 |
| 2017/0120329 A1 | * | 5/2017 | Orange .................. B33Y 70/00 |
| 2018/0104745 A1 | * | 4/2018 | L'Esperance ........... C21C 1/025 |

FOREIGN PATENT DOCUMENTS

| | | | |
|---|---|---|---|
| CN | 104959613 A | | 10/2015 |
| CN | 105364065 A | * | 3/2016 |
| CN | 105364065 A | | 3/2016 |
| CN | 105562696 A | | 5/2016 |
| CN | 106141169 A | | 11/2016 |
| CN | 107716935 A | | 2/2018 |

OTHER PUBLICATIONS

International Search Report and Written Opinion of the International Searching Authority dated Aug. 20, 2019 issued in corresponding International Patent Application No. PCT/IB2019/053831.

Extended European Search Report dated Dec. 3, 2021, issued in corresponding European Patent Application No. 19799218.3 (11 pgs.).

* cited by examiner

BINDER JETTING AND SUPERSOLIDUS SINTERING OF FERROUS POWDER METAL COMPONENTS

CROSS REFERENCE TO RELATED APPLICATIONS

The subject application claims priority to U.S. Provisional Patent Application No. 62/669,450, filed May 10, 2018, the subject matter of which is incorporated herein by reference in its entirety.

BACKGROUND

Field of the Invention

Various embodiments relate generally to additive manufacturing of metal parts, and more particularly to binder jet additive manufacturing of metal parts.

Description of Related Art

Processes for Additive Manufacturing of metallic parts have been developed for the fabrication of complex geometries in a variety of materials. Technologies such as Selective Laser Melting (SLM) and Electron Beam Melting (EBM) of particulate metals, typically produced by Gas Atomisation (GA), are known. Spherical GA powder grades are expensive and have found initial application in high value markets such as Aerospace and Medical Devices.

The Binder Jetting Additive Manufacturing (BJAM) process is also known for prototyping of polymer materials and for the production of sand cores for the casting industry. Metallic components are also produced by BJAM, at low sintered densities, requiring infiltration of parts after sintering. Slurry pump impellers are an example of application of this technology.

SUMMARY

Water Atomized (WA) grades of iron have been used for BJAM processes, but may require the additional expense of post-printing infiltration alloys to achieve high densities. In addition, final properties are limited to the given the microstructure and densities produced.

Highly wear resistant components in industrial and mining sector applications, such as slurry pump rotors and drill sections, are conventionally cast or machined from forgings. These alloys necessarily have very high hardness, for example 50-65 HRc, and are difficult to machine. It is not easy to design complex features for manufacturability reasons. Accordingly, one or more non-limiting embodiments utilize BJAM and sintering to facilitate the manufacture of complex shapes, with good wear resistant microstructures and high hardness levels. According to various of these embodiments, the design freedom and material properties offer advantages over conventional processing.

Additive Manufacturing typically requires expensive specialized iron powders (e.g., gas atomized iron powders). In contrast, one or more non-limiting embodiments use readily available low cost water atomized grades.

One or more non-limiting embodiments provides a method of manufacturing a metallic component by BJAM printing a powder blend of water atomized base iron powder and a at least one master ferroalloy powder to form a printed part, and super solidus sintering the printed part to form the metallic component.

According to one or more of these embodiments, the method also includes, before said printing, blending the water atomized base iron powder with the at least one master ferroalloy powder to form the powder blend.

According to one or more of these embodiments, the water atomized base iron powder comprises pure or prealloyed grade iron powder.

According to one or more of these embodiments, the sintering densifies the metallic component.

According to one or more of these embodiments, the metallic component comprises a high strength metallic component.

According to one or more of these embodiments, the ferroalloy comprises a transition element.

According to one or more of these embodiments, the transition element comprises Cr, Mn, Mo, V, W, Ni, or Cu.

According to one or more of these embodiments, the at least one master ferroalloy powder comprises between 5 and 10 wt % carbon.

According to one or more of these embodiments, the at least one master ferroalloy powder has a D50 particle size of less than 45 um.

According to one or more of these embodiments, the water atomized base iron powder has a D50 particle size of less than 40 um.

According to one or more of these embodiments, the water atomized base iron powder has a D50 particle size of between 70 and 130 um.

According to one or more of these embodiments, the powder blend has a total alloy content of between 15 and 35 wt %.

According to one or more of these embodiments, the powder blend has a carbon content of between 2 and 5 wt %.

According to one or more of these embodiments, said printing comprises curing and depowdering to form the printed part.

According to one or more of these embodiments, the printed part has a porosity of 40-60% before said sintering, and said sintering reduces the porosity to less than 10% in the metallic component.

According to one or more of these embodiments, the metallic component has a porosity of less than 10%.

According to one or more of these embodiments, said sintering occurs at temperatures between 1100 and 1400° C.

According to one or more of these embodiments, said sintering causes linearly shrinks the printed part by 15-25%.

According to one or more of these embodiments, a microstructure of the metallic component contains carbide phase portions embedded in a matrix, wherein the matrix is softer than the carbide phase portions.

According to one or more of these embodiments, the carbide phase portions have a micro hardness of 1000-1700 HV0.1.

According to one or more of these embodiments, the matrix has a micro hardness of 250-800 HV0.1.

According to one or more of these embodiments, upon completion of said sintering, the metallic component has a hardness of 30-50 HRC.

According to one or more of these embodiments, the method also includes, after said sintering, heat treating the metallic component, wherein said heat treating increases a hardness of the metallic component.

According to one or more of these embodiments, the metallic component contains carbide phase portions embedded in a martensitic matrix.

According to one or more of these embodiments, after said heat treating, the metallic component has a hardness of at least 50 HRC.

According to one or more of these embodiments, after said heat treating, the metallic component has a hardness of 55-65 HRC.

According to one or more of these embodiments, the carbide phase portions have a micro hardness of 1000-1700 HV0.1.

According to one or more of these embodiments, the matrix has a micro hardness of 600-800 HV0.1.

According to one or more of these embodiments, after said heat treating, the metallic component has a wear resistance so as to have a volume loss of less than or equal to 100 mm$^3$ according to ASTM G65-10 procedure A.

One or more embodiments provide a metallic component manufactured by: binder jet additive manufacture printing a powder blend to form a printed part; and super solidus sintering the printed part to form the metallic component. The powder blend comprises a blend of water atomized base iron powder and at least one master ferroalloy powder.

One or more embodiments facilitates the manufacture of complexly shaped ferrous alloy components to high densities, hardnesses, and toughnesses without the need for secondary operations to achieve the net desired component shape and size.

According to various embodiments, the BJAM printing process facilitates new low volume markets for complex, tough, hard components.

Components manufactured according to one or more of these embodiments may include drill parts, slurry pumps, etc.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc. Similarly, where multiple parameters (e.g., parameter C, parameter D) are separately disclosed as having ranges, the embodiments disclosed herein explicitly include combinations of any value within the disclosed range of one parameter (e.g., parameter C) with any value within the disclosed range of any other parameter (e.g., parameter D).

BRIEF DESCRIPTION OF THE DRAWINGS

For a better understanding of various embodiments as well as other objects and further features thereof, reference is made to the following description which is to be used in conjunction with the accompanying drawings, where.

DETAILED DESCRIPTION OF EXEMPLARY EMBODIMENTS

Figure 1:
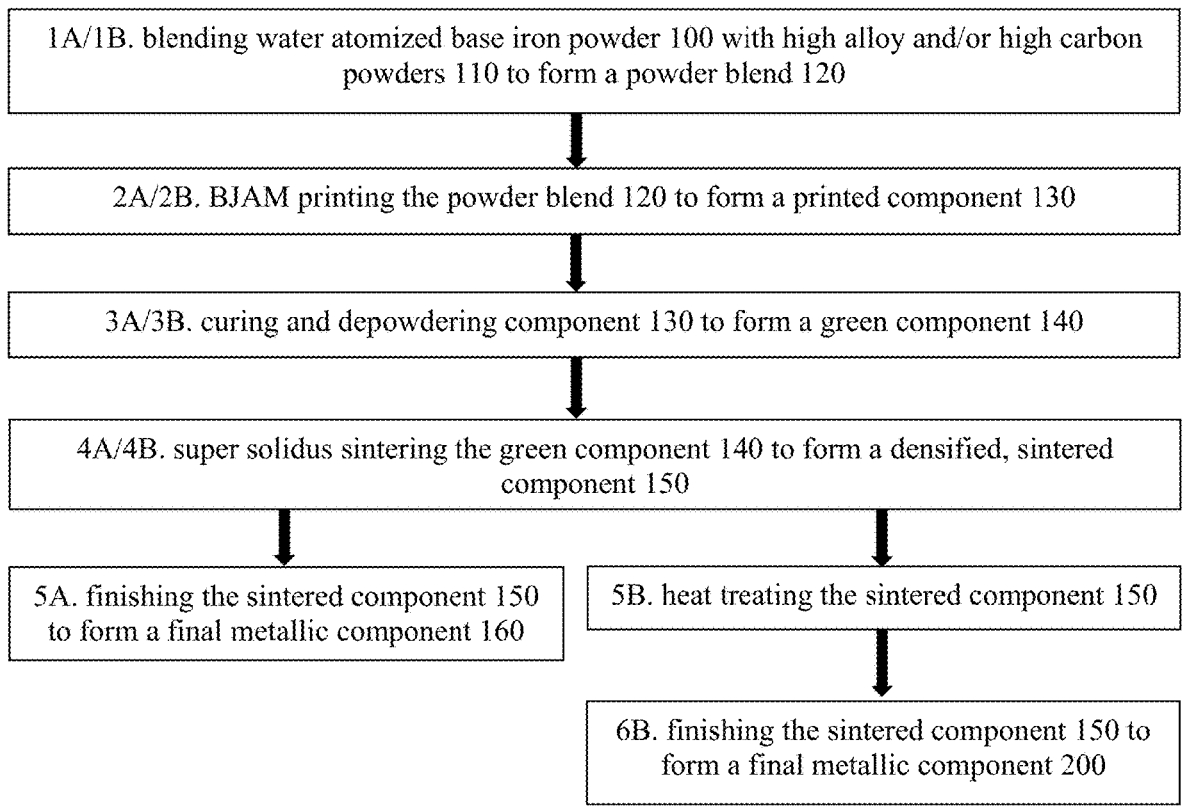
FIG. 1 is a flowchart illustrating various methods of manufacturing metallic components according to alternative embodiments.

FIG. 1 is a flowchart illustrating various methods of manufacturing metallic components according to alternative embodiments. Steps 1A-5A provide manufacturing steps for a non-heat treated component 160, while steps 1B-6B provide manufacturing steps for a heat-treated component 200.

At step 1A/1B, base iron powder and/or a prealloyed base iron powder 100 is blended with a master alloy powder 110 to form a powder blend 120.

According to various embodiments, the base iron powder 100 comprises at least 10, 20, 30, 40, 50, 60, 70, 80, 90, 95, and/or 100% water atomized (WA) elemental iron powder. According to various embodiments, the iron powder 100 comprises a standard, low-cost, WA iron powder. According to various embodiments, the WA iron powder 100 has a D40, D45, D50, D55, D60, D65, D70, D75, and/or D80 particle size of (a) less than 150, 140, 130, 125, 120, 115, 110, 105, 100, 95, 90, 85, 80, 70, 65, 60, 55, 50, 45, 40, 35, and/or 30 um, (b) more than 20, 25, 30, 35, 40, 45, 50, 55, 60, 65, 70, 75, 80, 85, 90, 95, and/or 100 um, and/or (c) between any two such values (e.g., a D50 particle size of between 20 and 150 um, 25 and 40 um, and/or 90 and 110 um; a D60 particle size of between 20 and 150 um, 25 and 40 um, and/or 90 and 110 um).

According to various embodiments, the master alloy powder 110 comprises at least one ferroalloy powder that includes ferrous powder with a high alloy and high carbon content. According to various embodiments, the alloy material of the master alloy powder 110 comprises one or more transition elements typically used in steel and cast iron metallurgy, including but not limited to, Cr, Mn, Mo, V, W, Ni, and/or Cu. Thus, the master alloy powder 110 may comprise one or more ferroalloys such as ferromanganese (FeMn), ferrochromium (FeCr), ferrovanadium (FeV), and/or ferromolybdenum (FeMo). According to various embodiments, the master alloy powder 110 comprises a mixture of one or more of these ferroalloys (including any and all combinations of these ferroalloys). For example, according to various embodiments, the master alloy powder 110 comprises a mixture of the FeMn Powder Blend (discussed below) and FeCr Powder Blend (discussed below).

According to various embodiments, the master alloy powder 110 has a carbon content of (a) at least 2, 3, 4, 5, 6, 7, 8, 9, and/or 10 wt %, (b) less than 14, 13, 12, 11, 10, 9, 8, 7, 6, 5, 4, 3, 2, and/or 1 wt %, and/or (c) between any two such values (e.g., between 2 and 14 wt %, between 5 and 10 wt %). According to various embodiments, the use of ferroalloys with high carbon content facilitates effective BJAM printing of the alloy powder 110 so as to facilitate BJAM introduction of the included carbon into the printed component 130. The ferroalloys thus function as an effective BJAM printable carrier for carbon so as to increase the carbon content of the printed component 130.

According to various embodiments, the master alloy powder 110 has a D40, D50, D60, D70, and/or D80 particle size of (a) less than 70, 65, 60, 55, 50, 45, 40, 35, 30, 25, 20, 19, 18, 17, 16, 15, 14, 13, 12, 11, 10, and/or 9 um, (b) more than 5, 6, 7, 8, 9, 10, 15, 20, 25, and/or 30 um, and/or (c) between any two such values (e.g., between 5 and 70 um, between 5 and 45 um, between 8 and 12 um).

According to one embodiment, the master alloy powder 110 comprises 6.53% C, 75.3% Mn, 1.5% Si, 0.025% S, and 0.18% P, with a D50 of 8.1 um and a D97 of 20.76 um. Hereinafter, this master alloy powder is referred to as FeMn Powder Blend (despite the fact that this powder comprises additional components).

According to an alternative embodiment, the master alloy powder 110 comprises 8.7% C, 60.4% Cr, 2.7% Si, 0.03% S, and 0.03% P, with a D50 of 8.2 um and a D97 of 22.18 um. Hereinafter, this master alloy powder is referred to as FeCr Powder Blend (despite the fact that this powder comprises additional components).

According to an alternative embodiment, the master alloy powder 110 comprises 50% FeCr Powder Blend and 50% FeMn Powder Blend. According to an alternative embodiment, the master alloy powder 110 comprises about 97% FeCr Powder Blend and about 3% FeMn Powder Blend. However, any ratio of such Powder Blends may be used for the master alloy powder 110, e.g., at least 1, 2, 3, 4, 5, 10, 15, 20, 30, 40, 50, 60, 70, 80, 85, 90, 95, 96, 97, 98, and/or 99% FeCr Powder Blend, and/or at least 1, 2, 3, 4, 5, 10, 15, 20, 30, 40, 50, 60, 70, 80, 85, 90, 95, 96, 97, 98, and/or 99% FeMn Powder Blend.

According to various embodiments, introduction of carbon via the master alloy powder 110, rather than via elemental carbon (e.g., graphite), promotes more even mixing and distribution of the carbon content within the powder blend 120 (and the resulting printed component 130).

According to various embodiments, the base iron powder 100 may be blended with the master alloy powder 110 in a variety of combinations to tailor the powder blend 120 as appropriate to achieve specific application property requirements. According to various embodiments, base iron powder 100 content of the powder blend 120 is (a) at least 45, 50, 55, 60, 65, 70, 75, 80, and/or 85%, (b) less than 95, 90, 85, 80, 75, 70, 65, 60, 55, 50, 45, 40, and/or 35%, and/or (c) between any two such values (e.g., between 45 and 95%, between 55 and 65%, between 75 and 85%). According to various embodiments, the master alloy powder 110 content of the powder blend 120 is (a) less than 65, 60, 55, 50, 45, 40, 35, 30, 25, 20, and/or 15%, (b) greater than 5, 10, 15, 20, 25, 30, 35, 40, 45, 50, 55, 60, and/or 65%, and/or (c) between any two such values (e.g., between 5 and 65%, between 35 and 45%, between 25 and 35%).

According to various embodiments, the powder blend 120 has a total non-Fe alloy content (i.e., the cumulative content of the non-iron components of the powder blend 120 (e.g., including Cr, Mn, Mo, C, etc.)) of at least 5, 10, 15, 20, 25 wt %, less than 50, 45, 40, 35, 30 wt %, and/or between any two such values (e.g., between 5 and 50 wt %, between 10 and 45 wt %, between 15 and 35 wt %). According to various embodiments, the total iron content of the powder blend 120 may comprise (a) at least 50, 55, 60, 65, 70, 75, 80, 85, 90, and/or 95% Fe, (b) less than 5, 10, 15, 20, and/or 25% Fe, and/or (c) any value between any two such upper and lower values (e.g., between 50 and 95% Fe, between 55 and 90% Fe, between 65 and 85% Fe).

According to various embodiments, the blend powder 120 has a carbon content of (a) at least 1, 2, 2.5, 3, 3.5, and/or 4 wt %, (b) less than 6, 5.5, 5, 4.5, 4, 3.5, 3, 2.5, 2, and/or 1 wt %, and/or (c) between any two such values (e.g., between 2 and 5 wt %, between 2 and 3.5 wt %).

According to one embodiment (hereinafter referred to as blend code E2132), the blended powder 120 comprises about 20% FeCr alloy Powder (e.g., 28% Fe, 60% Cr, 9% C), 20% FeMn alloy Powder Blend (e.g., 17% Fe, 75% Mn, 6% C), and about 60% base iron powder 100. According to various embodiments, after sintering, E2132 comprises about 3.05% C, 15% Mn, 12% Cr, 0.84% Si, and about 70% Fe.

According to an alternative embodiment (hereinafter referred to as blend code E2138), the blend powder 120 comprises about 30% FeCr Powder, 1% FeMn Powder, and about 69% base iron powder 100. According to various embodiments, after sintering, E2138 comprises about 2.7% C, 0.75% Mn, 18.1% Cr, 0.83% Si, and about 78% Fe.

According to various embodiments, the powder blend 120 comprises 11-30% Cr, 0-2.5% Ni., 0-18% Mn, 0-3% Mo, 0-1.2% Cu, 2-5% C, 0-3% V, and the balance being Fe and unavoidable impurities.

At step 2A/2B, the blend powder 120 is BJAM printed into a printed 3D component 130 made up of a plurality of layers bound together to form the 3D component. According to various embodiments, carbon is introduced into the component 130 via the carbon content of the master alloy powder 110, rather than through elemental carbon (e.g., graphite). According to various embodiments, this avoids the difficult process of BJAM printing elemental carbon (e.g., graphite) and/or avoids having to modify the WA iron powder to have a higher carbon content. It would be difficult or impossible to simply blend elemental carbon into the powder to be printed because elemental carbon (graphite) is very fine (e.g., 5-15 um) and dusty and would not blend well or flow and spread. According to various embodiments, adding carbon as a master alloy form allows blending and spreading in the powder bed.

At step 3A/3B, the printed component 130 is cured and depowdered to form a green component 140. According to various embodiments a density of the green component 140 is (a) at least 30%, 35%, 40%, 45%, 50%, 55%, and/or 60%, (b) less than 65%, 60%, 55%, 50%, 45%, and/or 40%, and/or (c) between any two such values (e.g., between 30 and 65%, between 30 and 60%, between 35 and 55%, between 40 and 60%). According to various embodiments, a density of the green component 140 is a function of the particle size distribution of the powder blend 120, and is relatively close to an apparent density of the powder blend 120 (e.g., ranging from 3 g/cc to 4 g/cc according to various non-limiting embodiments).

At step 4A/4B, the green component 140 is super solidus sintered to form a sintered component 150. Super solidus sintering results in a combination of liquid and solid phases being present at different percentages. The liquid phase material helps to shrink and densify the component, while the solid phase material helps to maintain the component's shape and avoid slumping.

According to various embodiments, the super solidus sintering occurs at temperatures between 1100 and 1400° C. According to various embodiments, the sintering temperature is selected to correspond to the super solidus temperature of constituents of the component 140 (i.e., the super solidus range based on the phase diagram of the component 140). As the sintering temperature increases, carbon diffuses until locally it forms a liquid phase, which promotes interdiffusion of alloy elements with iron. At the top temperature, there remains a percentage of liquid phase which accelerates further particle consolidation and sintering, pore rounding, densification, and homogenization of carbon and alloys.

Figure 2:
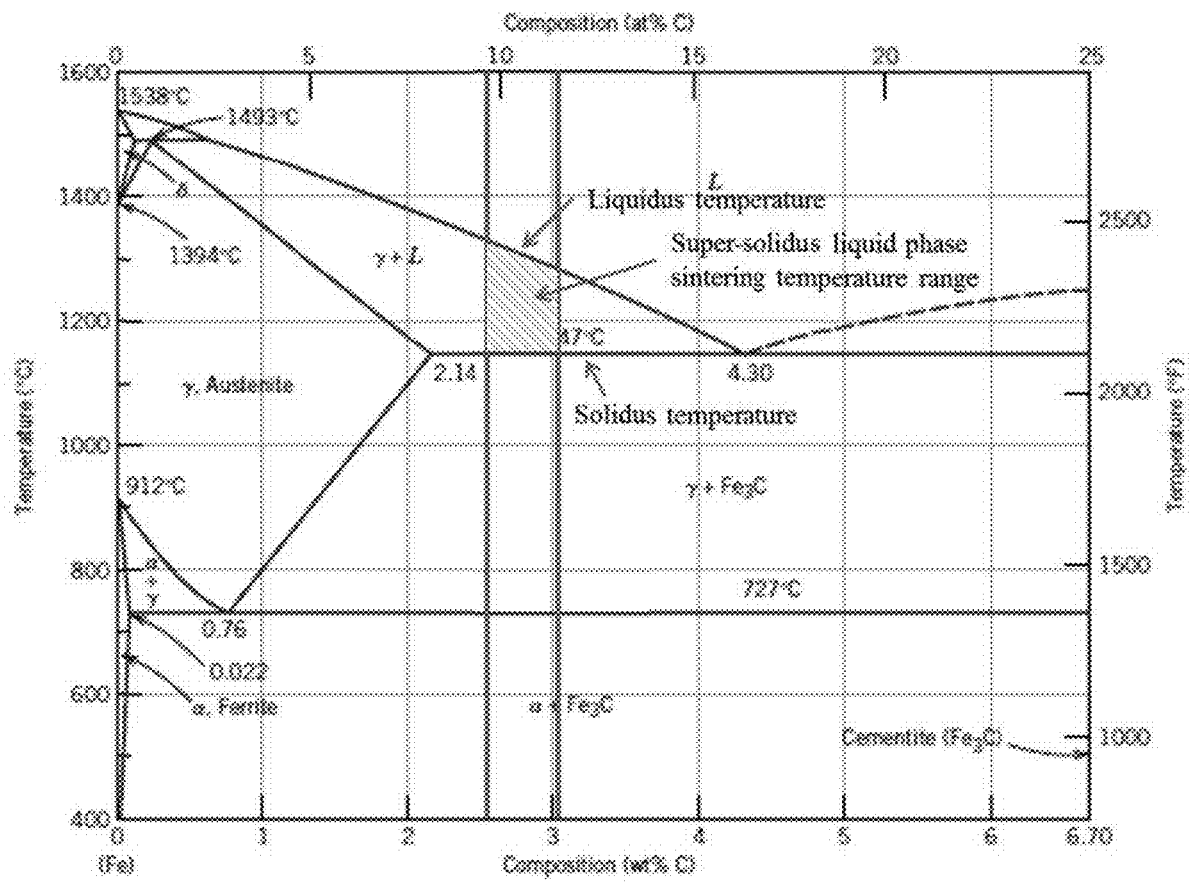
FIG. 2 is an illustrative Fe—C phase diagram.

The sintering temperature may be balanced to increase liquid phase material, while maintaining sufficient solid phase material to maintain the component's shape. According to one or more embodiments, the sintering occurs in the shaded super solidus temperature zone shown in FIG. 2. The phase diagram in FIG. 2 is for Fe—C only, and is provided for illustration purposes only. The addition of alloys (e.g., transition metals) will modify the phase diagram of the actual alloy powder.

According to various embodiments, the sintering shrinks and densifies the green component 140 so as to create a sintered component 150 with a density of (a) at least 80, 81, 82, 83, 84, 85, 86, 87, 88, 89, 90, 91, and/or 92%, (b) less than 100, 99, 98, 97, 96, 95, 94, 93, and/or (c) between any two such values (e.g., between 80 and 99%, between 85 and 95%, between 90 and 95%). According to various embodiments, such density is achieved without post-sintering infiltration of material.

According to various embodiments, the sintering results in linear shrinkage of the green component 150 of (a) at least 15, 16, 17, 18, 19, 20, 21, 22, 23, 24, 25, 26, 27, 28, 29, and/or 30%, (b) less than 40, 35, 34, 33, 32, 31, 30, 29, 28, 27, 26, 25, 24, 23, 22, 21, 20, 19, and/or 18%, and/or (c) between any two such values (e.g., between 15 and 40%, between 20 and 27%, between 15 and 25%).

At step 5A, the sintered metallic component 150 is finished (e.g., via machining, polishing, etc.) to form the non-heat-treated final metallic component 160. However, according to various embodiments, the finishing step is omitted, and the sintered metallic component 150 is the final metallic component.

According to various embodiments, the component 160 has a hardness of (a) at least 25, 30, 35, 40, and/or 45 HRC, (b) less than 55, 50, 45, 40, and/or 35 HRC, and/or (c) between any two such values (e.g., between 25 and 55 HRC, between 30 and 50 HRC, between 35 and 45 HRC).

According to various embodiments, the component 160 has a microstructure that contains relatively hard carbide phase portions embedded in an austenite matrix that is softer than the carbide phase portions. According to various embodiments, the component 160 has a good combination of wear resistance and toughness. According to various embodiments, the carbide phase portions have a micro hardness of 1000-1700 HV0.1, and the matrix has a micro hardness of 250-800 HV0.1 and/or 250-350 HV0.1.

According to one or more embodiments, the powder blend 120 is E2132, the sintering occurs at around 1180° C. and results in about 23% linear shrinkage, the post-sintering (e.g., non-heat treated) hardness of the component 160 is about 37.0 HRC, a micro hardness of the carbide phase portions is about 1089 HV0.1, and a micro hardness of the matrix (e.g., austenite) is about 313 HV0.1, and a Transverse Rupture Strength (TRS) of the component 160 is about 1373 MPa.

Alternatively, as shown as step 5B, the sintered metallic component 150 may be heat treated (e.g., hardening, quenching).

Although not illustrated in FIG. 1, the sintered metallic component 150 may be finished/machined prior to the heat treatment step 5B. According to various embodiments, such finishing/machining is easier to do prior to the heat treatment. The finishing/machining may be done to conform the component 150 to the desired shape and tolerances of the final component 200.

At step 6B, the heat-treated metallic component is finished to form a final, heat-treated metallic component 200. However, according to various embodiments, the finishing step is omitted, and the heat-treated metallic component is the final metallic component.

According to various embodiments, the component 200 has a microstructure that contains hard carbide phase portions embedded in a hard martensitic matrix. According to various embodiments, the component has superior wear resistance and high hardness. According to various embodiments, the carbide phase portions of the component 200 have a micro hardness of 1000-1700 HV0.1. According to various embodiments, the matrix of the component 200 has a micro hardness of 600-800 HV0.1. According to various embodiments, after said heat treating, the metallic component 200 has a wear resistance so as to have a volume loss of less than or equal to 100 mm$^3$ according to ASTM G65-10 procedure A.

According to various embodiments, the component 200 has a hardness of (a) at least 40, 45, 50, 55, and/or 60 HRC, (b) less than 80, 75, 70, 65, and/or 60 HRC, and/or (c) between any two such values (e.g., between 40 and 80 HRC, between 50 and 60 HRC, between 55 and 65 HRC).

According to one or more embodiments, the powder blend 120 is E2138, the sintering occurs at around 1300° C. and results in a density of about 7.50 g/cc, the sintered component 150 is heat treated via neutral hardening, the post-heat-treated hardness of the component 200 is about 60 HRC, a micro hardness of the carbide phase portions is about 1550 HV0.1, and a micro hardness of the martensitic matrix is about 690 HV0.1. However, according to alternative embodiments, the E2138 powder blend 120 may alternatively be used in a process that omits a heat treatment step to provide a final metallic component 160 made from E2138 with carbide phase embedded in a ferritic/pearlitic matrix.

Unless otherwise specifically stated, all contents and percentages are on a weight basis. Thus, 5% means 5 weight (wt) %.

Figure 3:
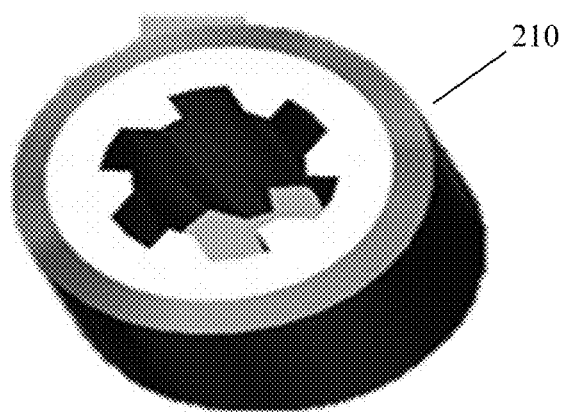
FIG. 3 is a perspective drawing of a metallic component made in accordance with one or more of the manufacturing methods shown in FIG. 1.

According to various embodiments, the components 150, 160, 200 may comprise components of a rock drill (e.g., a rifle nut 210 (see FIG. 3), a splined nut, a rifle piston, a chuck, etc.), including, without limitation, any of the components of the rock drill disclosed in U.S. Pat. Nos. 3,055,441 or 2,061,807, the entire contents of both of which are hereby incorporated by reference herein. According to various embodiments, the components 150, 160, 200 may comprise one or more components of a slurry pump (e.g., rotor, vane, impeller, pump housing, volute), including, without limitation, any of the components of the slurry pump disclosed in U.S. Pat. No. 5,797,724, which is hereby incorporated herein in its entirety.

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A method of manufacturing a metallic component, the method comprising:
   binder jet additive manufacture printing a powder blend to form a printed part; and super solidus sintering the printed part to form the metallic component, wherein said powder blend has a carbon content of at least 1 wt % and comprises a blend of water atomized base iron powder and at least one master ferroalloy powder, wherein the at least one master ferroalloy has a carbon alloy content of at least 5 wt %, and wherein the at least 1 wt % carbon content of the powder blend is defined by the carbon alloy content of the at least one master ferroalloy, and not by elemental carbon.

2. The method of claim 1, further comprising:
   before said printing, blending the water atomized base iron powder with the at least one master ferroalloy powder to form the powder blend.

3. The method of claim 2, wherein the water atomized base iron powder comprises pure or prealloyed grade iron powder.

4. The method of claim 1, wherein the sintering densifies the metallic component.

5. The method of claim 1, wherein the at least one master ferroalloy powder comprises at least one transition element.

6. The method of claim 5, wherein the at least one transition element comprises Cr, Mn, Mo, V, W, Ni, or Cu.

7. The method of claim 1, wherein the carbon alloy content of the at least one master ferroalloy powder is between 5 and 10 wt %.

8. The method of claim 1, wherein the water atomized base iron powder has a D50 particle size of between 90 and 110 micrometers.

9. The method of claim 1, wherein the powder blend has a total alloy content of between 15 and 35 wt %.

10. The method of claim 1, wherein the powder blend has a carbon content of between 2 and 5 wt %.

11. The method of claim 1, wherein said printing comprises curing and depowdering to form the printed part.

12. The method of claim 1, wherein the printed part has a porosity of 40-60% before said sintering, and said sintering reduces the porosity to less than 10% in the metallic component.

13. The method of claim 1, wherein the metallic component has a porosity of less than 10%.

14. The method of claim 1, wherein said sintering occurs at temperatures between 1100 and 1400° C.

15. The method of claim 1, wherein said sintering linearly shrinks the printed part by 15-25%.

16. The method of claim 1, wherein a microstructure of the metallic component contains carbide phase portions embedded in a matrix, wherein the matrix is softer than the carbide phase portions.

17. The method of claim 16, wherein the carbide phase portions have a micro hardness of 1000-1700 HV0.1.

18. The method of claim 16, wherein the matrix has a micro hardness of 250-800 HV0.1.

19. The method of claim 1, wherein, upon completion of said sintering, the metallic component has a hardness of 30-50 HRC.

20. The method of claim 1, further comprising, after said sintering, heat treating the metallic component, wherein said heat treating increases a hardness of the metallic component.

21. The method of claim 20, wherein, after said heat treating, a microstructure of the metallic component contains carbide phase portions embedded in a martensitic matrix.

22. The method of claim 20, wherein after said heat treating, the metallic component has a hardness of at least 50 HRC.

23. The method of claim 20, wherein after said heat treating, the metallic component has a hardness of 55-65 HRC.

24. The method of claim 20, wherein the carbide phase portions have a micro hardness of 1000-1700 HV0.1.

25. The method of claim 20, wherein the matrix has a micro hardness of 600-800 HV0.1.

26. The method of claim 20, wherein after said heat treating, the metallic component has a wear resistance so as to have a volume loss of less than or equal to 100 mm3 according to ASTM G65-10 procedure A.

27. The method of claim 1, wherein the super solidus sintering shrinks and densifies the printed part.

28. The method of claim 1, wherein the sintering results in linear shrinkage of the printed part of between 15 and 40%.

29. The method of claim 1, wherein:
the super solidus sintering comprises densifying the printed part; and
the densifying results in the metallic component having a density of at least 80%, and wherein the densifying is achieved without post-sintering infiltration of material.

30. The method of claim 1, wherein said binder jet additive manufacture printing is done without binder jet additive manufacture printing elemental carbon.

31. A method of manufacturing a metallic component, the method comprising:
binder jet additive manufacture printing a powder blend to form a printed part; and
super solidus sintering the printed part to form the metallic component,
wherein said powder blend has a carbon alloy content of at least 1 wt % and comprises a blend of water atomized base iron powder and at least one master ferroalloy powder, and
wherein said binder jet additive manufacture printing is done without binder jet additive manufacture printing elemental carbon.

32. The method of claim 27, wherein the powder blend has a total alloy content of between 15 and 35 wt %.

33. The method of claim 1, wherein the water atomized base iron powder is in elemental iron form.

34. A method of manufacturing a metallic component, the method comprising:
binder jet additive manufacture printing a powder blend to form a printed part; and super solidus sintering the printed part to form the metallic component, wherein said powder blend has a carbon content of at least 1 wt % and comprises a blend of water atomized base iron powder and at least one master ferroalloy powder, wherein the at least one master ferroalloy has a carbon alloy content of at least 5 wt %, and wherein the water atomized base iron powder has a D50 particle size of more than 20 μm.

35. The method of claim 1, wherein the at least one master ferroalloy powder has a D50 particle size of less than 20 um.

* * * * *